Patented Oct. 15, 1946

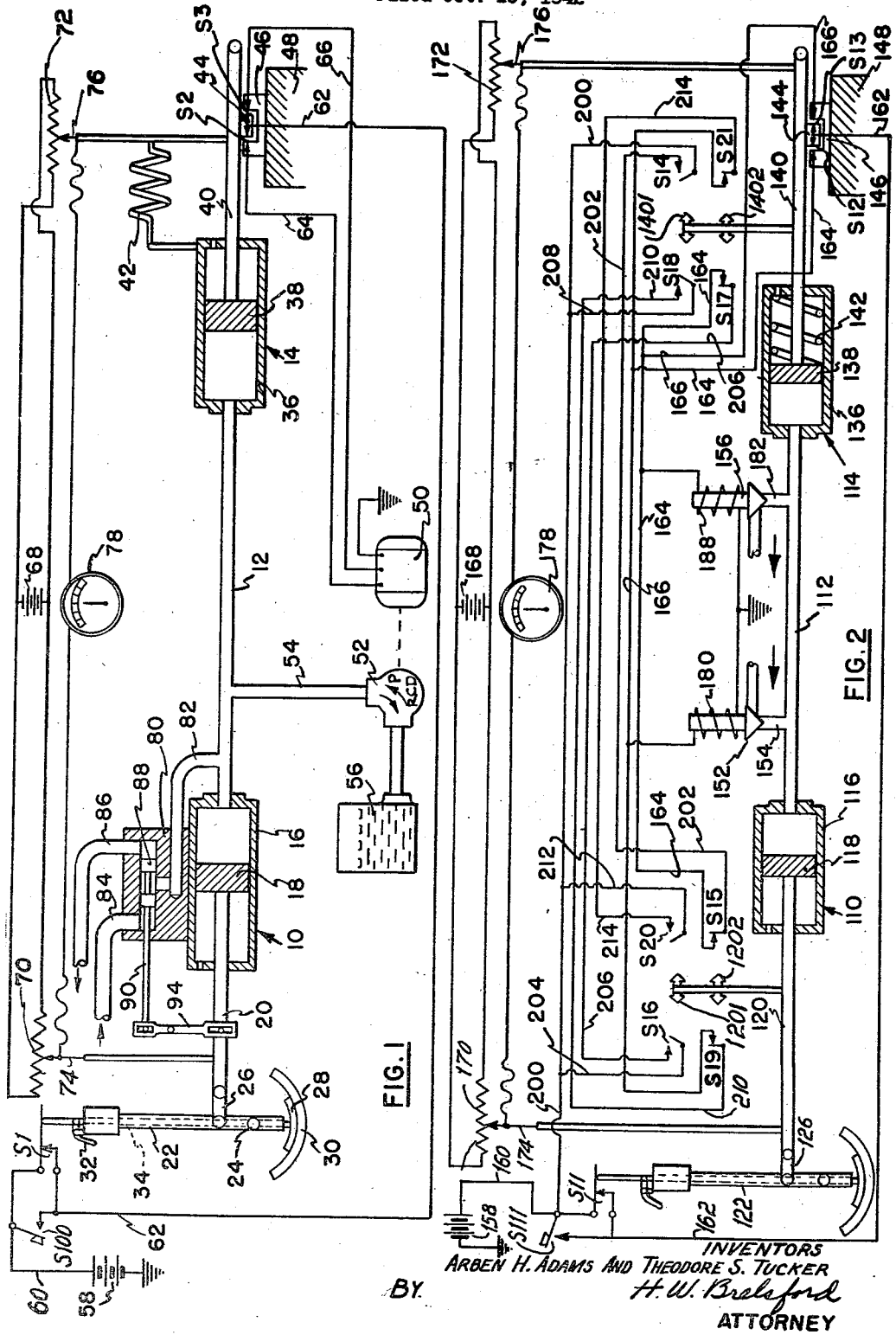

2,409,175

UNITED STATES PATENT OFFICE 2,409,175

HYDRAULIC SYSTEM

Arben H. Adams and Theodore S. Tucker, North Hollywood, Calif., assignors, by mesne assignments, to Bendix Aviation Corporation, South Bend, Ind., a corporation of Delaware Application October 19, 1942, Serial No. 462,614

12 Claims. (Cl. 60—54.5)

This invention relates to fluid actuating systems, and more particularly to fluid actuating systems incorporating automatic means for compensating for fluid expansion or contraction, or other factors affecting volume.

An object of the invention is to provide a fluid actuating system wherein the driven member is held in registration within close limits.

Another object is to provide electrical means for compensating a fluid actuating system for changes and fluid volume.

Another object is to provide a fluid actuating system having indicating means to show lack of registration of driving and driven parts.

Another object of the invention is to provide electrical contact means for compensating a fluid system.

Another object is to provide a fluid actuating system having automatic indexing means when the driving member reaches the extremes of its movement.

Another object is to provide automatic electrical means for indexing a fluid system at the extremes of movement of the driving member.

Other objects and advantages of the invention will be apparent in the following description and claims.

In the drawing forming a part of this specification:

Figure 1 is a schematic showing of a fluid actuating system having electrical compensating means and a fluid indexing means; and Figure 2 is a schematic showing of a fluid actuating system having electrical compensating means as well as electrical indexing means.

In this specification the word "synchronization" will be used to denote a correspondence of position of driving and driven units while moving. In other words, this relates to a dynamic condition. The word "registration" will be used to denote a correspondence of position between driving and driven units while both are stationary. This word therefore refers to a static condition. The word "indexing" will be used to describe the act of registering driving and driven units at a selected position of one unit, as at the ends of the stroke of the driving unit.

Referring to Figure 1, a master cylinder unit 10 is connected by a conduit 12 to a motor unit 14. The master unit includes a cylinder housing 16, a piston 18 movable therein connected to a piston rod 20. Piston rod 20 is actuated by a manual lever 22 pivoted at 24 and connected by a link 26 to piston rod 20. The lever 22 is maintained in place by a brake shoe 28 contacting a braking surface 30. Brake shoe 28 is lifted when movement of the lever is desired and this is performed by manually depressing thumb lever 32 which lifts rod 34, shown largely in dotted outline.

Motor cylinder 14 includes a housing 36, a piston 38 connected to a piston rod 40, and a tension spring 42 connected to the housing 36 and rod 40, to urge piston 38 toward the left end of cylinder 36.

In normal operation, clockwise movement of lever 22 creates pressure on the fluid in the master cylinder 10 forcing it through conduit 12 into motor cylinder 14. The fluid causes piston 38 to move the exact amount that piston 18 moves, inasmuch as cylinders 16 and 36 are the same size.

This fluid actuating system is subject to thermal expansion and contraction, however, which increases or decreases the volume of the fluid in conduit 12 or in cylinders 16 and 36 causing a lack of registry between the master and slave pistons 18 and 38 respectively. For example, the actuating system may be used on an airplane, whereby the pilot controls the throttle of an engine placed in the wing of an airplane. When the airplane is flying in the higher cold altitudes the fluid in conduit 12 contracts causing the piston 38 to move to the left, upsetting the throttle setting. Or, when the plane lands, the wing may be exposed to the sun's rays, heating up the fluid until the piston 38 moves to the right, giving a change in throttle setting.

The invention includes means to compensate for this fluid expansion and contraction so that the motor cylinder 38 remains at the point to which it was moved, within extremely close limits. Formed on motor piston rod 40 is a projection 44. A slide member 46 sliding on a base 48 is adapted to be contacted by projection 44. The clearance between projection 44 and slide 46 is made extremely small and may be .003 of an inch on an end. Electrical current is supplied to projection 44 and a circuit is completed when it contacts slide 46, sending current to a reversible electric motor 50. Motor 50 drives a reversible pump 52 which is connected by a branch conduit 54 to conduit 12. Pump 52 adds or subtracts fluid from conduit 54, removing or adding it to a reservoir 56, all depending upon whether there is expansion or contraction.

The electrical circuit is supplied by a battery 58 (near control lever 22) connected by a wire 60 to a switch S1. Switch S1 is normally closed but is opened by depressing thumb lever 32. Leading from switch S1 is a wire 62 which leads to projection 44. Switches S2 and S3 connect the wire 62 to wires 64 or 66 respectively leading to reversible motor 50, causing it to rotate in one direction or another according to which wire delivers the current. In actual practice micro switches are used for switches S2 and S3. In that event, wire 62 is merely forked and connected to wires 64 and 66 through micro switches which are normally open. Projection 44 then merely serves as a mechanical block for closing the switches. Micro switches normally close on a movement of .002 of an inch. Thus if a clearance of .003 of an inch is allowed at each end, .002 of which is taken up by micro switch movement, there will be a neutral free area of .001 of an inch.

Since it might possibly happen that the motor and master cylinders will get out of registration in spite of the compensating device, an indicator is provided for this purpose. The indicator includes a battery 68 having parallel connections through resistors 70 and 72 from positive to negative. Take offs 74 and 76 are provided for each resistance and are mechanically moved along their respective resistance by master piston rod 20 and motor piston rod 40 respectively. The take-offs 74 and 76 are connected to a polar galvanometer 78. Since the voltages at corresponding points on the resistances 70 and 72 are equal, any lack of registration will be shown up quantitatively and qualitatively on the galvanometer 78.

Having been informed by galvanometer 78 of a lack of synchronism, the operator may compensate for the same in two ways. He may move the lever 22 in the direction to cause pump 52 to correct the system and at the same time keep a switch S100, in shunt to switch S1, closed. This may be continued until the galvanometer reads zero. Or, he may use the hydraulic indexing or registering means which will now be explained. Mounted on master cylinder 16 is a valve housing 80 having conduit 82 connected from it to conduit 12. Also connected to the housing is a pressure conduit 84 and an exhaust conduit 86. A valve slide member 88 is connected to lever 22 by rods 90 and 92 and rocker arm 94. When valve slide 88 is at the right end of housing 80 conduit 12 is connected to exhaust and when valve slide 88 is to the left, conduit 12 is connected to pressure.

The operation of the system of Figure 1 is as follows: The operator grasps lever 22, depressing thumb lever 32, lifting brake shoe 30 and opening switch S1. To move motor piston 38 to the right, the lever is moved clockwise and the pressure created by piston 18 is transmitted through conduit 12 to piston 38, causing it to move a corresponding amount. When the motor piston moves to the desired amount the thumb lever 32 is released, lever 22 is locked in position and switch S1 closed. The movement of motor piston rod 40 also moves slide 46 with it, closing switch S3. When switch S3 is closed current flows through wire 66 to motor 50, causing pump 52 to subtract or withdraw fluid from conduit 12. This action continues until motor piston 38 moves .002 of an inch to the left, opening switch S3 and breaking the circuit to motor 50. Thus, the motor piston moves a slight amount after being set by the master unit, but this movement is so slight that it does not interfere with practical operations.

If the fluid in conduit 12 should expand due to heat or otherwise, the switch S3 will close after piston 38 has moved .002 or .003 of an inch. This starts motor 50 to act on pump 52 to subtract fluid from conduit 12 until motor piston 38 returns to its original position and again opens switch S3. If the fluid should thermally contract in conduit 12 or elsewhere, or become less because of leakage, the spring 42 will force piston 38 to the left. When this movement exceeds .003 of an inch, projection 44 will close switch S2 and operate motor 50 in the opposite direction to add fluid to conduit 12 from reservoir 56 until the motor piston 38 returns to its original position.

If the operator should now desire to move motor piston 38 to the left, he moves lever 22 in a counter-clockwise direction. Master piston 18 thereupon moves to the left, relieving fluid pressure momentarily, allowing motor spring 42 to move motor piston 38 to the left a corresponding amount. At the end of the movement, switch S2 will still be closed and the motor 50 will operate until motor piston 38 moves about .002 of an inch to the right. Thereafter leakage and thermal expansion and contraction will be compensated for in the manner described above.

Since a continued series of operations of the master cylinder in the same direction might result in a lack of synchronism between master and motor units, galvanometer 78 is provided to indicate this. Registration is important when it is desired to move the motor cylinder to a given position by moving lever 22 to a predetermined position. The bridge system connected to galvanometer 78 indicates the direction and the amount of lack of synchronism.

Lack of registration may be corrected by moving lever 22 to close the proper switch S2 or S3 at the same time keeping switch S100 closed. Thus if there is too little fluid in the system, piston 18 should be moved to the left, closing switch S2, which in turn actuates motor 50, causing pump 52 to add to the system. By moving piston 18 slowly to the left, this adding action may be continued until the desired amount of fluid is added, as indicated by meter 78. If there is too much liquid in the system, piston 18 may be moved to the right until switch S3 is closed. This causes pump 56 to subtract liquid to the system, and by moving piston 18 to the right at the same rate of speed, this action may be continued until the desired amount is subtracted.

Or, alternatively, the lever 22 may be moved to one extreme or the other with switch S100 in open position. If moved to the left, valve 88 will move to the right connecting conduit 12 to exhaust, relieving any excess fluid since spring 42 moves motor piston 38 to the extreme left. If lever 22 is moved to the extreme right and the brake is set, pressure fluid flows through valve 88 to conduit 12 to supply any deficiency until motor piston 38 moves to the extreme right of its cylinder. If extremely high pressures are used they will merely force master piston 18 to the left also, closing valve 88 through lever 22.

From the foregoing description of Figure 1, it will be apparent that there are three cooperating parts of the invention, all necessary for the single result of a registered and compensated fluid actuating system. Thus, the compensating system counteracts expansion, contraction and leakage. The indicating system shows whether or not there is registration between the driving and driven parts. The compensation system, or the separate hydraulic indexer, valve 88, may be used to restore registration as previously explained.

The device of Figure 2 will now be described. It is essentially the same as Figure 1 except that the hydraulic indexer (valve 88) is replaced by an electrical indexer or means to register the driving and motor units at the extremes of the strokes. A lever 122 is connected by a link 126 to a piston rod 120 connected to a piston 118. Piston 118 reciprocates in a cylinder 116 and forms a master cylinder unit 110 with the same.

A conduit 112 connects cylinder 116 to a motor cylinder 136 having a piston 138 reciprocable therein and urged to the left by a compression spring 142. Connected to piston 138 is a piston rod 140 having a projection 144 engaging a slide member 146 slideable on a base 148. The motor unit is 114.

Branching from conduit 112 is a conduit 154 controlled by a solenoid operated poppet 152 controlling the flow of fluid under pressure. A second branch 182 is controlled by a solenoid operated poppet 156 controlling the flow of fluid to exhaust.

The compensating circuit includes a battery 158 connected by a wire 160 to a switch S11 which in turn is connected by a wire 162 to projection 144. Switches S12 and S13 are placed on either side of projection 144 and are connected to wires 164 and 166 respectively, wire 164 leading to pressure solenoid 180 and wire 166 leading to exhaust solenoid 188. The operation is much the same as in Figure 1, fluid being added or subtracted from conduit 112 by valves 152 and 156 respectively.

The electrical indexer of Figure 2 will now be described. Branching from battery 158 is a wire 200 passing near the motor unit 114 where it is connected to a normally open switch S14. Leading from switch S14 is a wire 202 leading to a normally closed switch S15. Switch S15 is in turn connected to exhaust solenoid wire 164. Thus, if master piston rod 120 is moved toward the extreme right, and there is more fluid in conduit 112 than normally prevails, motor piston 138 will be "ahead" of master piston 118. For this reason, motor piston 138 will reach the end of its stroke and switch S14 will be closed by an actuator 1401 movable with the rod 140 before switch S15 is opened by an actuator 1202 on rod 120, exhausting the excess fluid by valve 156 until the master piston also reaches the end of its stroke, at which time switch S15 is opened, breaking the circuit, and closing the connection to exhaust.

Branching from the left end of wire 200 is a wire 204 leading to a normally open switch S16. Switch S16 is connected to a wire 206 leading to a point near the motor cylinder to a normally closed switch S17, the other end of which is connected to exhaust wire 164. Thus, if there is too much fluid in the connections for registration and lever 122 is moved to the extreme left, switch S16 will be closed by an actuator 1201 on rod 120 before switch S17 is opened by an actuator 1402. This opens exhaust valve 156 allowing the fluid to escape to exhaust until motor piston 138 also reaches the end of its stroke. At this point switch S17 will be opened, breaking the circuit and allowing valve 156 to close.

Branching from wire 200 near the right end is a wire 208 leading to a normally open switch S18. This switch is connected to a wire 210 leading toward the master cylinder to a normally closed switch S19. Switch S19 is connected to pressure solenoid wire 166. Thus, when there is too little fluid in the connections, and lever 122 is moved toward the extreme left, motor switch S18 will close before master switch S19 opens. This opens pressure valve 152 until sufficient fluid has entered the system so that lever 122 can be moved to the extreme left, at which point it opens switch S19 breaking the circuit.

Branching from wire 200 near the left is a wire 212 connected to a normally open switch S20 connected to a wire 214 leading toward the motor unit to a normally closed switch S21, which in turn is connected to pressure solenoid wire 166. When there is too little fluid for registration and lever 122 is moved toward the extreme right, it will close switch S20 while switch S21 is closed, passing pressure fluid into the system. When registration is achieved, motor piston 138 will open switch S21, stopping the flow of fluid.

The indicator device of Figure 2 is the same as that of Figure 1, and includes a battery 168, parallel resistances 170 and 172, and wipers 174 and 176, as well as a galvanometer 178.

The operation of the system of Figure 2 is as follows: Movement of lever 122 moves piston 118, which in turn, through fluid compression or the tension of spring 142, moves motor piston 138 a corresponding amount and direction. Motor piston rod 140 moves slide 146 with it, then projection 144. After the initial correction as described with reference to Figure 1, switches S12 and S13 open the pressure and exhaust valves 152 and 156 respectively, depending upon whether there is contraction or expansion.

Lack of registration is indicated by galvanometer 178, in which case lever 122 may be moved to one extreme or the other to index or synchronize the master and slave units. If there is too much fluid in the connections, movement of lever 122 to the right will close switch S14, opening exhaust valve 156 until lever 122 reaches the extreme right position, at which time switch S15 is opened. Likewise, movement of lever 122 to the left closes switch S16, opening exhaust valve 156 until motor piston 138 reaches the extreme left, opening switch S17.

Too little fluid for registration results in switch S20 closing on clockwise movement of lever 122, opening pressure valve 152 until motor piston 138 opens switch S21. Leftward movement of lever 122 closes switch S18 adding fluid until lever 122 can go to the extreme left and open switch S19.

The word "fluid" has been used in describing the invention, since gas or liquid can be used as the operating medium. It will be appreciated, however, that for best results an incompressible liquid is preferable.

Although this invention has been described with reference to particular embodiments thereof, it is not limited to these embodiments nor otherwise except by the terms of the following claims:

We claim:

1. A fluid actuating system comprising driving means, driven means, a fluid connection between said means whereby said driven means moves in response to said driving means, movable means moved by said driven means, switch means actuated by contact of said driven means with said movable means, a connection to exhaust, a valve to control the same, a connection to pressure and a valve to control the same, said valves being controlled by said switch means whereby fluid is removed or added to said driving, driven and connection means depending upon the direction of contact of said driven means with said movable means.

2. A fluid actuating system comprising driving means, driven means, a fluid connection between said means whereby said driven means moves in response to said driving means, movable means moved by said driven means, switch means actuated by contact of said driven means with said movable means, a connection to exhaust, a valve to control the same, a connection to pressure, a valve to control the same, said valves being controlled by said switches whereby fluid is removed or added to said driving, driven and connection means depending upon the direction of contact of said driven means with said movable means, and means to render said switches inoperative when said driving means is operating to move said driven means.

3. A fluid actuating system comprising driving means, driven means, a fluid connection between the same, means to compensate for volume changes in the fluid, means to indicate the state of registration of said driving and driven means, and indexing means comprising a valve adapted to connect said system to exhaust at one extreme of movement of said driving means and to connect said system to pressure at the other extreme of movement.

4. In a fluid actuating system including driving means, driven means, a fluid connection between the same; an indexing valve connected to said system and actuated by said driving means to connect said system to pressure at one extreme of movement of said driving means and connect said system to exhaust at the other extreme of movement of said driving means.

5. In a fluid actuating system including driving means, driven means, and a fluid connection between the same; an electrical indexer comprising interconnected switch means at both ends of the strokes of both of said driving and said driven means, and fluid adding and subtracting means to index said driving and driven means, and operated by said switch means.

6. A fluid actuating system comprising driving means, driven means, a fluid connection between said means, electrical means compensating for fluid volume changes within close limits, means to index said driving and said driven means, and means to indicate the state of registration of said driving and said driven means, said indicator means comprising a source of electrical potential, two resistances connected to said source, a wiper on each said resistance, one moved by the driving means and one moved by said driven means, and a polar galvanometer connected to said wipers.

7. A fluid actuating system comprising driving means, driven means, a fluid connection between the same whereby said driven means moves in response to said driving means volume compensating means to add and subtract fluid to and from said driving, driven, and connecting means, a member moved by said driven means, switch means actuated by contact of said member with the driven means to actuate said volume compensating means to add or subtract fluid depending upon the direction of contact, and means interlocked with said driving means to render said first-mentioned switch means inoperative when said driving means is operating to move said driven means.

8. A fluid actuating system comprising driving means, driven means, a fluid connection between said means whereby said driven means moves in response to said driving means, moveable means moved by said driven means, switch means actuated by contact of said driven means with said movable means, compensating means to add and subtract fluid from driving, driven and connecting means and controlled by said switch means, and electrical indexing means connected to said compensating means and operative at at least one point of stroke of the driving means to actuate said compensating means to register said driving and said driven means.

9. A fluid actuating system comprising driving means, driven means, a fluid connection between the same, moveable means moved by said driven means, first switch means actuated by contact of said driven means with said moveable means, a fluid connection to exhaust, a valve to control the same, a fluid connection to fluid under pressure, a valve to control the same, a connection to said valves from the first switch means to selectively actuate said valves depending upon the direction of contact of said driven means with said moveable means to add or subtract fluid for compensating purposes, and a second switch means operable at at least one point in the stroke of the driving means, and connected to said valves for control of the same, to register said driven means with said driving means.

10. In a fluid actuating system including driving means and driven means movable through corresponding ranges and a fluid connection between said means whereby said driven means is moved in response to movement of said driving means; indexing means responsive to movement of said driving means into one end of its range of movement for varying the volume of the fluid in the system in direction to move the driven means into its corresponding end position, and means responsive to movement of said driven means into its corresponding end position for disabling said indexing means.

11. A fluid actuating system comprising driving means, driven means, a fluid connection between said means whereby said driven means moves in response to said driving means, a first member moved by said driven means, a second, freely movable member in the path of said first member and adapted to be contacted by and moved only by contact with said first member and be frictionally retained in whatever position it is moved to by said driving means, means to vary the volume of fluid in said system to compensate for fluid volume changes, switch means actuated by contact of said first member with said second member to actuate said volume varying means in such direction as to reverse the movement of said driven means, and means for disabling said volume-varying means during movement of said driving means.

12. A fluid actuating system comprising driving means, driven means, a fluid connection between said means whereby said driven means moves in response to said driving means, a first member coupled to said driven means for movement therewith and a second, freely movable member in the path of said first member and adapted to be contacted by and moved only by contact with said first member and be frictionally retained in whatever position it is moved by said driving means, said first member having a small range of movement with respect to said second member, compensating means for varying the volume of fluid in said system to compensate for fluid volume changes, switch means selectively responsive to relative movement of said first member in either direction with respect to said second member for actuating said compensating means to vary the volume of fluid in such direction as to reverse the direction of movement of said driven means and said first member, means for disabling said compensating means during movement of said driving means.

ARBEN H. ADAMS.
THEODORE S. TUCKER.